US007786899B2

(12) United States Patent
Baker et al.

(10) Patent No.: US 7,786,899 B2
(45) Date of Patent: Aug. 31, 2010

(54) SYSTEM AND METHOD FOR DISPLAYING AIR TRAFFIC INFORMATION

(75) Inventors: Daniel Baker, Houston, TX (US); Karl Lehenbauer, Houston, TX (US); David Cameron McNett, Austin, TX (US)

(73) Assignee: FlightAware, LLC, Houston, TX (US)

( * ) Notice: Subject to any disclaimer, the term of this patent is extended or adjusted under 35 U.S.C. 154(b) by 755 days.

(21) Appl. No.: 11/550,131

(22) Filed: Oct. 17, 2006

(65) Prior Publication Data

US 2008/0088433 A1 Apr. 17, 2008

(51) Int. Cl.

| | |
|---|---|
| ***G08B 21/00*** | (2006.01) |
| ***G01C 23/00*** | (2006.01) |
| ***G08G 1/123*** | (2006.01) |
| ***G05D 1/00*** | (2006.01) |
| ***G01M 17/00*** | (2006.01) |

(52) U.S. Cl. .................... 340/971; 340/945; 340/995.1; 340/995.19; 701/1; 701/3; 701/29

(58) Field of Classification Search ......... 370/971–980, 370/994, 995.1, 995.13, 945.8, 995.24, 995.19, 370/945; 701/1, 3, 29; 707/10; 705/1, 14
See application file for complete search history.

(56) References Cited

U.S. PATENT DOCUMENTS

| | | | | |
|---|---|---|---|---|
| 6,353,794 | B1 * | 3/2002 | Davis et al. | 701/201 |
| 6,754,581 | B1 * | 6/2004 | Blachowicz et al. | 701/202 |
| 6,792,340 | B2 * | 9/2004 | Dunsky et al. | 701/3 |
| 6,992,596 | B2 * | 1/2006 | Cole et al. | 340/971 |
| 7,546,206 | B1 * | 6/2009 | Miller et al. | 701/210 |
| 2002/0082848 | A1 | 6/2002 | Hansen et al. | |
| 2003/0137435 | A1 * | 7/2003 | Haddad et al. | 340/994 |
| 2004/0148179 | A1 | 7/2004 | Kumhyr et al. | |
| 2005/0246275 | A1 | 11/2005 | Nelson | |

* cited by examiner

*Primary Examiner*—Benjamin C Lee
*Assistant Examiner*—Lam P Pham
(74) *Attorney, Agent, or Firm*—Woodard, Emhardt, Moriarty, McNett & Henry, LLP

(57) ABSTRACT

A computer-implemented system and method for the processing and presentation of customizable aviation information is disclosed. At plurality of flight information is received over a digital network and is stored in at least a database. The database includes aviation information as well as aviation related content and advertisements. The user is able to customize a series of screen layouts for display using a combination of screen segments containing content stored at least partially in the database. In addition, the user may create personalized messages and status update for display in response to a variety of flight conditions. In one form, the results may be presented using a large display monitor by an aircraft service provider. Additionally, the display may include only flight tracking information relevant to recent and future customers.

35 Claims, 9 Drawing Sheets

SYSTEM AND METHOD FOR DISPLAYING AIR TRAFFIC INFORMATION

FIELD OF THE INVENTION

The present invention generally relates to a system and method for receiving and processing flight tracking information for presentation. More particularly, the present invention can be used as a customizable flight tracking display including value added content provided by the local airport user that is triggered or sequenced by criteria that uses the flight tracking data.

BACKGROUND

In modern society, a growing number of people frequently travel long distances, for both business and pleasure. For large corporations, private business owners, and the affluent, private air travel has become the preferred method of travel in these instances. In addition, many business people and groups of vacationers are upset about high costs and inconvenient and/or inflexible schedules of air travel on commercial aircraft, and therefore are looking more and more to fly on private aircraft or to charter aircraft. Some business executives have simply stopped taking domestic commercial flights due to the time, hassle and cost involved, particularly considering the value of the executives' time.

In the United States, there are almost 20,000 airports. Of these, over 5,000 are open to the public, but only 550 regularly accommodate regularly scheduled airline flights. Making use of these runways is a fleet of more than 210,000 aircraft, of which only 8,000 are used for regularly scheduled commercial flights. This means that approximately 200,000 actively registered private aircraft are flying in and out of nearly 20,000 airfields large and small, flown by the roughly 250,000 private pilots.

Whether the individual owns the private aircraft or leases it from an aircraft provider, or charters it, the amenities inside the aircraft are typically upscale. Modern private aircraft often include such amenities as leather ergonomic seating, custom designed interiors, gourmet meals, and high tech entertainment systems. As such, the passengers aboard many of these private aircraft have come to expect top of the line service and amenities.

While a large number of the 200,000 registered private aircraft may not be extravagant private jets, a shift is occurring at the airports which service these private aircraft towards more upscale and efficient operations. For example, most airports provide Fixed Based Operators (FBOs) which are service providers which offer aircraft services such as fueling and de-fueling, aircraft parking, tie-down and hangar storage, aircraft and instrument service, aircraft towing, baggage handling, and cleaning. In addition, FBOs commonly provide accommodations, such as lounges and catering services, coordinate transportation such as limousine pick up, and a wide variety of related and non-related services.

SUMMARY

Various technologies and techniques are disclosed for providing a customized display, containing at least a portion of flight tracking information obtained from a near real-time source. In one form, the user accesses a service through a series of web pages presented to the user. The user is able to select a set of flights from a set of flights scheduled for arrival/departure from a designated airport/facility that typically are not regularly scheduled commercial flights. A customized display is then presented on a monitor operated by the user which presents the information in a value added format that is triggered or sequenced based on flight tracking data. Value added information can include an automatic instruction for the line crew to get the fuel truck, or for the ground transportation services to be called, as a condition of the estimated time of arrival. Similarly, it can include advertisements related to the flight information such that some advertisements are shown only before arrival and others only after arrival or shortly before departure. By automatically linking display of value-added information to the status of the flight, many benefits can be realized.

In another embodiment, the service allows the user to customize messages with personal content for display on the monitor based upon a number of criteria, such as the status of a particular flight as determined from the flight tracking data.

Yet other forms, embodiments, objects, advantages, benefits, features, and aspects of the present invention will become apparent from the detailed description and drawings contained herein.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein, as well as from the claims.

DETAILED DESCRIPTION

Figure 1:
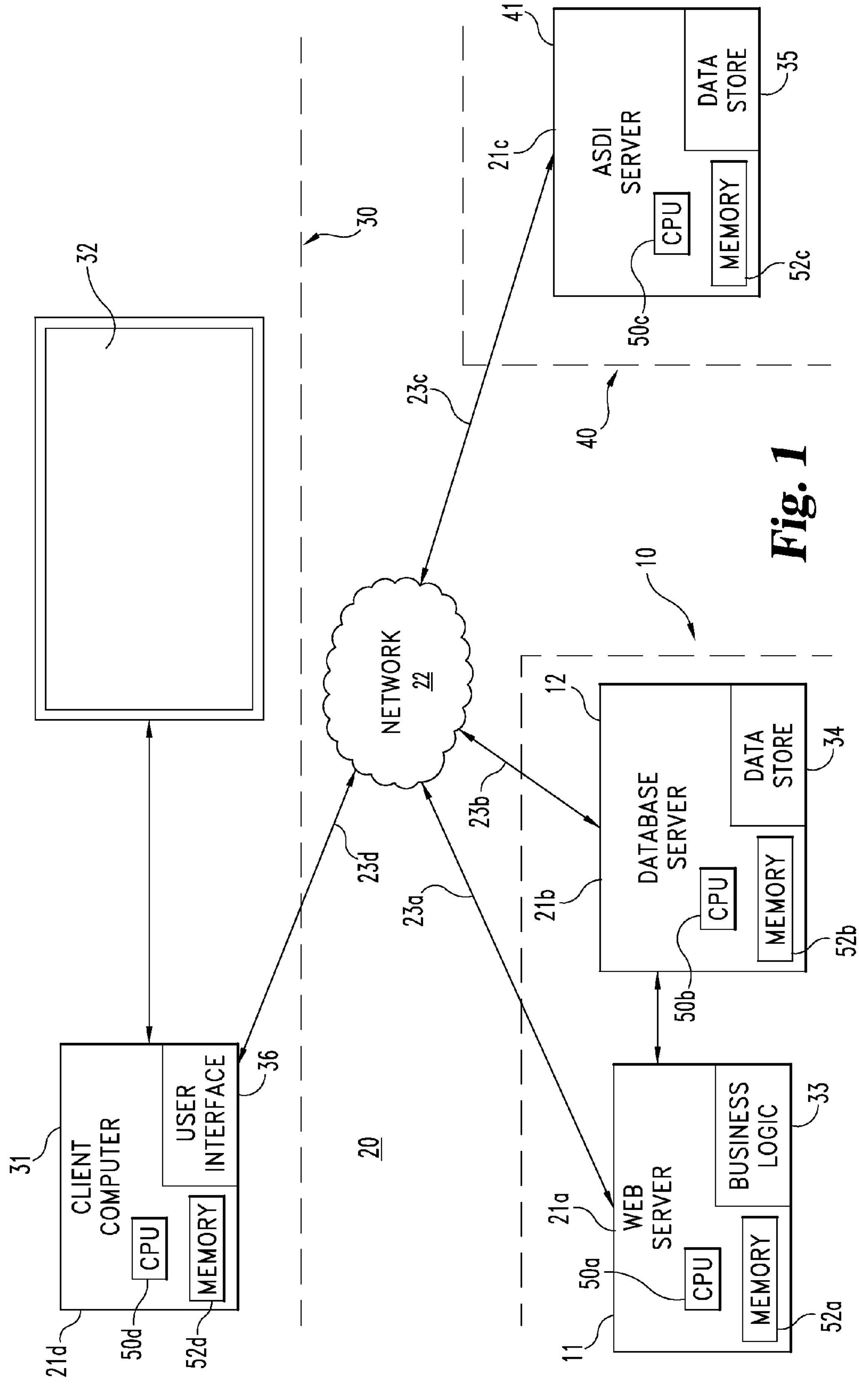
FIG. 1 is a diagrammatic view of a computer system of one implementation.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Currently, systems exist which provide general flight status information using visual monitors. The most common example of this is the well known and universally used arrival and departure boards present at virtually every commercial airport. Users can easily view information such as flight number, arrival/departure time, origin/destination, gate, baggage carousel number, and status of a flight. This enables passengers and others in the airport to find the proper time and location for their flight and baggage. Until applicants' invention, this method of presenting flight information had been difficult for air traffic that is not regularly-scheduled commercial flights, such as private or chartered aircraft. In addition, due to the smaller number of passengers and flights, a high level of customization and personalization may be included by the operator. Applicants have incorporated many of the features disclosed herein into a fully functioning website at http://flightaware.com/airportaware/, incorporated herein by reference.

In 1995, the United States Federal Aviation Administration (FAA) made a wealth of minute-by-minute flight tracking information available for distribution to the public with the creation of the Aircraft Situation Display to Industry (ASDI) service. Through this service, flight tracking data is made available to several vendors who are subsequently able to provide information in a value-added format to their subscribers. The ASDI information includes the location, altitude, airspeed, origin, destination, estimated time of arrival and tail number or designated identifier of air carrier and general aviation aircraft operating on at least the corresponding IFR flight plans within U.S. airspace. General aviation VFR flights that include air traffic control flight following are often included. Early adopters of the information provided by the ASDI service include air charter operators, limousine firms, and fixed base operators (FBOs).

As the growth of the private aviation industry increases, a shift has occurred in the level and efficiency of services demanded by the corporate passengers and affluent individuals commonly aboard. FBOs and other service providers are renovating their facilities in order to compete for the business of a higher end clientele. By incorporating a personalized display capable of visually welcoming passengers and providing pertinent information to them a higher level of client satisfaction is achieved. The present invention is directed toward receiving and processing aviation information and content and providing information of interest to the passengers in one or more aspects of the invention, but the present invention also serves other purposes in addition to these.

FIG. 1 is a diagrammatic view of computer system 20 of one embodiment of the present invention. In the illustrative embodiment, computer system 20 includes aviation information service 10, flight tracking information provider 40, and client system 30. Computer system 20 also includes computer network 22. Computer network 22 couples together a number of computers 21*a*-21*d* over network pathways 23*a*-23*d*, respectively. More specifically, system 20 includes several servers, namely Web Server 11 and Database Server 12 of aviation information service 10, and ASDI Server 41 of flight tracking information provider 40. System 20 also includes client computer 31 and display 32. While computers 21*a*-21*d* are each illustrated as being a server or client, it should be understood that any of computers 21*a*-21*d* may be arranged to include both a client and server. Furthermore, it should be understood that while four computers 21*a*-21*d* are illustrated, more or fewer may be utilized in alternative embodiments. Preferably, service 10 includes a collection of Web servers 11 for handling content delivery to number of client computers, such as client computer 31.

Computers 21*a*-21*d* include one or more processors or CPUs (50*a*, 50*b*, 50*c*, and 50*d*, respectively) and one or more types of memory (52*a*, 52*b*, 52*c*, 52*d*, respectively). Each memory 52 preferably includes a removable memory device. Each processor 50 may be comprised of one or more components configured as a single unit. When of a multi-component form, a processor 50 may have one or more components located remotely relative to the others. One or more components of each processor 50 may be of the electronic variety defining digital circuitry, analog circuitry, or both. In one embodiment, each processor 50 is of a conventional, integrated circuit microprocessor arrangement, such as one or more OPTERON processors supplied by ADVANCED MICRO DEVICES Corporation of One AMD Place, Sunnyvale, Calif. 94088, USA.

Each memory 52 (removable, fixed or both) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types, or other types not included in the above list. Also, each memory may be volatile, nonvolatile, or a hybrid combination of volatile and nonvolatile varieties.

Although not shown to preserve clarity, one or more of computers 21*a*-21*d* may be coupled to a display and/or may include an integrated display. Computers 21*a*-21*d* may be of the same type, or a heterogeneous combination of different computing devices. Likewise, displays may be of the same type, or a heterogeneous combination of different visual devices. Although again not shown to preserve clarity, each computer 21*a*-21*d* may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers like computers 21*a*-21*d* can be coupled together by computer network 22.

In one embodiment, system 20 operates at one or more physical locations. Web Server 11 is configured as a web server that hosts application business logic 33 for an value added flight tracking information engine, Database Server 12 is configured as a database server for storing aviation information provided by ASDI Server 41, and client computer 31 is configured for providing a user interface 36 for accessing the value added flight tracking information service 10 and providing a video signal to display 32. User interface 36 of client computers 31 can be an installable application such as one that communicates with Web Server 11, can be browser-based, and/or can be embedded software, to name a few non-limiting examples. In one form, display 32 is a Liquid Crystal Display (LCD), but may be a Cathode Ray Tube (CRT), plasma, laser display device, Digital Light Processing (DLP) monitor, projector or other video display currently known in the art or later developed. Preferably, display 32 is at least 37" in size allowing it to be easily read from a variety of different locations and distances.

In one embodiment, software installed locally on client computer 31 is used to communicate with Web Server 11. In another embodiment, Web Server 11 provides content such as video clips, images, templates, and/or advertising in addition to flight tracking information to client computers 31 when requested. One of ordinary skill in the art will recognize that the term web server is used generically for purposes of illustration and is not meant to imply that network 22 is required to be the Internet. As described previously, network 22 can be one of various types of networks as would occur to one of ordinary skill in the art. Database (data store) 34 on Database Server 12 can store data such as flight tracking information, departure/arrival notices, flight plans, historical flight information, aircraft information, aviation related content, and/or advertisement messages to name a few representative examples.

In the illustrative embodiment, flight tracking information is received from ASDI Server 41 which is at least one server that is a part of the Aircraft Situation Display to Industry Service (ASDI) provided by the Federal Aviation Administration (FAA). The feed provided by the ASDI service may be in real time or delayed, such as subject to a five minute delay. Connections to the feed are established in a structured format according to *Aircraft Situation Display to Industry: Functional Description and Interface Control Document* (available at http://www.fly.faa.gov/ASDI/asdi.html) which is herein incorporated by reference in its entirety.

Typical applications of system 20 would include more client computers coupled to displays, like client computer 31 and display 32 at more physical locations, but only one has been illustrated in FIG. 1 to preserve clarity. In an alternate form, client computers 31 may be coupled to more than one display. Furthermore, although two servers 11 and 12 are shown, it will be appreciated by those of ordinary skill in the art that the one or more features provided by Web Server 11 and Database Server 12 could be provided by the same computer or varying other arrangements of computers at one or more physical locations and still be within the spirit of the invention. Farms of dedicated servers, a single proprietary system, and/or a Storage Area Network (SAN) could also be provided to support the specific features if desired. In the illustrative embodiment, in order to flexibly handle the large quantity of flight information received by service 10, Database Server 12 includes a relational database as in known to one of skill in the art.

In the illustrative embodiment, value added flight tracking information service 10 is associated with the Federal Aviation Administration (FAA) Enhanced Traffic Management System (ETMS) through the Aircraft Situation Display to Industry (ASDI) feed provided from the Volpe National Transportation System Center (VNTSC). The feed may include all flight plan information for flights in the National Airspace System (NAS).

Using the ASDI feed provided by the FAA, flight tracking data including information regarding flights for all aircraft flying using "instrument flight rules" (IFR) is obtained by the service 10. The information includes regularly-scheduled commercial airlines and most charter, private, and corporate airlines, while general aviation VFR (Visual Flight Rules) flights that include air traffic control flight following are often also included. The information provided by the ASDI feed and utilized by the service 10 includes the location, altitude, airspeed, origin, destination, estimated time of arrival and tail number or designated identifier of air carrier and general aviation aircraft. This information is provided through a continuous stream of messages, each message having a type such as those described below:

| Message Type: | Content: |
|---|---|
| NAS AF | revised flight plan data whenever a flight plan is amended |
| NAS AZ | arrival data for all eligible arriving flights |
| NAS DZ | departure message |
| NAS FZ | initial flight plan data |
| NAS RZ | cancellation data |
| NAS TZ | flight position updates |
| NAS UZ | ARTCC boundary crossing data |
| NAS RT | prediction data, such as ETA |
| NAS TO | oceanic flight position data |

These messages are used to compile and update a database of records for each flight within the applicable airspace system, such as for the U.S. and/or Canada. In the illustrative embodiment, the database is maintained in data store 34 of Database Server 12 and accessible via Web Server 11. Further information relating to the processing of ASDI messages can be found in pending application Ser. No. 11/530,357, which is herein incorporated by reference, filed on Sep. 8, 2006, and commonly assigned to FlightAware LLC, assignee of the present application.

Using the data stored in Database Server 12, Web Server 11 is able to provide content, containing flight information among other things, to client computer 31 for storage, configuration, and subsequent presentation on display 32. In the preferred form, the content is substantially aviation/business related. Additionally, client computer 31 is operable to customize the flight information it receives from Web Server 11 as well as download/create content to be incorporated into the visual display.

Figure 2:
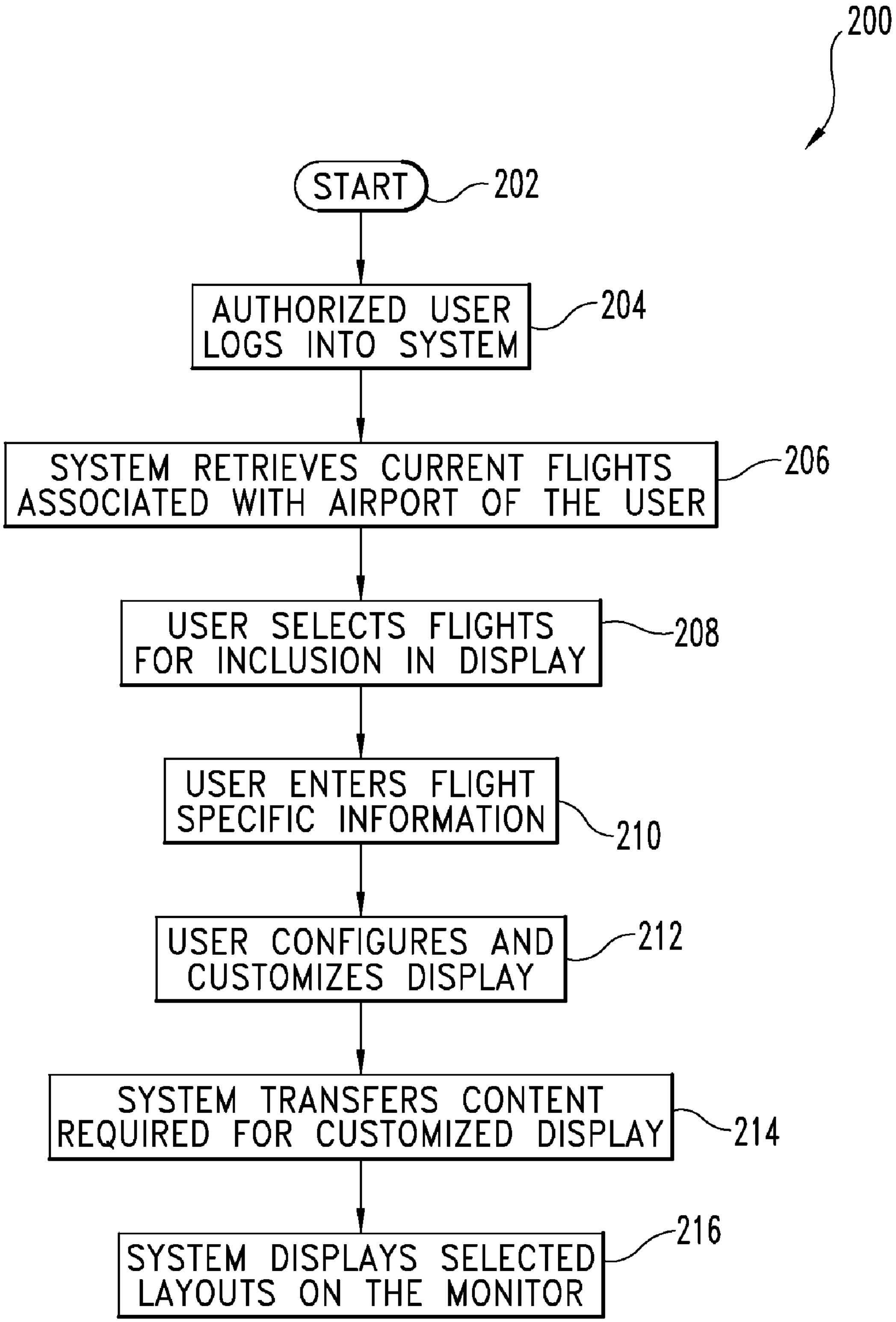
FIG. 2 is a process flow diagram illustrating the stages involved in creating a customized display using the system of FIG. 1.

Turning to FIG. 2, with continued reference to FIG. 1, a process flow diagram illustrates the stages involved in creating a customized display for presentation on the provided monitor. In the illustrative embodiment, the user is an employee/manager of a FBO using client computer 31 behind a desk, and the FBO operates monitor 32 within its main lounge. The process 200 begins at start point 202 with an authorized user logging into the service 10. In the illustrative embodiment, the user accesses interactive web pages stored on Web Server 11 of service 10 over network 22 using client computer 31. In one form, service 10 allows the user to log in using a username and password combination (stage 204). However, it shall be appreciated that other log in methods known to those of skill in the art may be utilized depending upon the level of security and ease of use desired.

Once the user is logged in, service 10 retrieves a listing of the current flights scheduled to arrive at or depart from the airport associated with the user (stage 206). In the illustrative embodiment, the airport upon which the FBO user is located is associated with the FBO account when created. In alternate forms, the user may select the airport of interest. In service 10, Web Server 11 retrieves a listing from Database Server 12 all flights scheduled to arrive or depart from the associated airport. The scheduled arrivals and departures are populated within Database Server 12 by the flight tracking information feed provided from ASDI Server 41. In one form, the flight plan data is utilized to identify arriving and departing flights.

Once service 10 populates the listing, the scheduled flights for the associated airport are presented to the user. The user selects a set of flights for inclusion in the display sent to monitor 32 (stage 208). In the illustrative embodiment, the user selects only the flights which are scheduled for service at their FBO. Therefore, the display is highly tailored to upcoming clients. In one form, client computer receives and stores flight information regarding all flights associated with the airport of the user. In an alternate form, the client computer receives and stores only information regarding only the selected flights.

Figure 3:
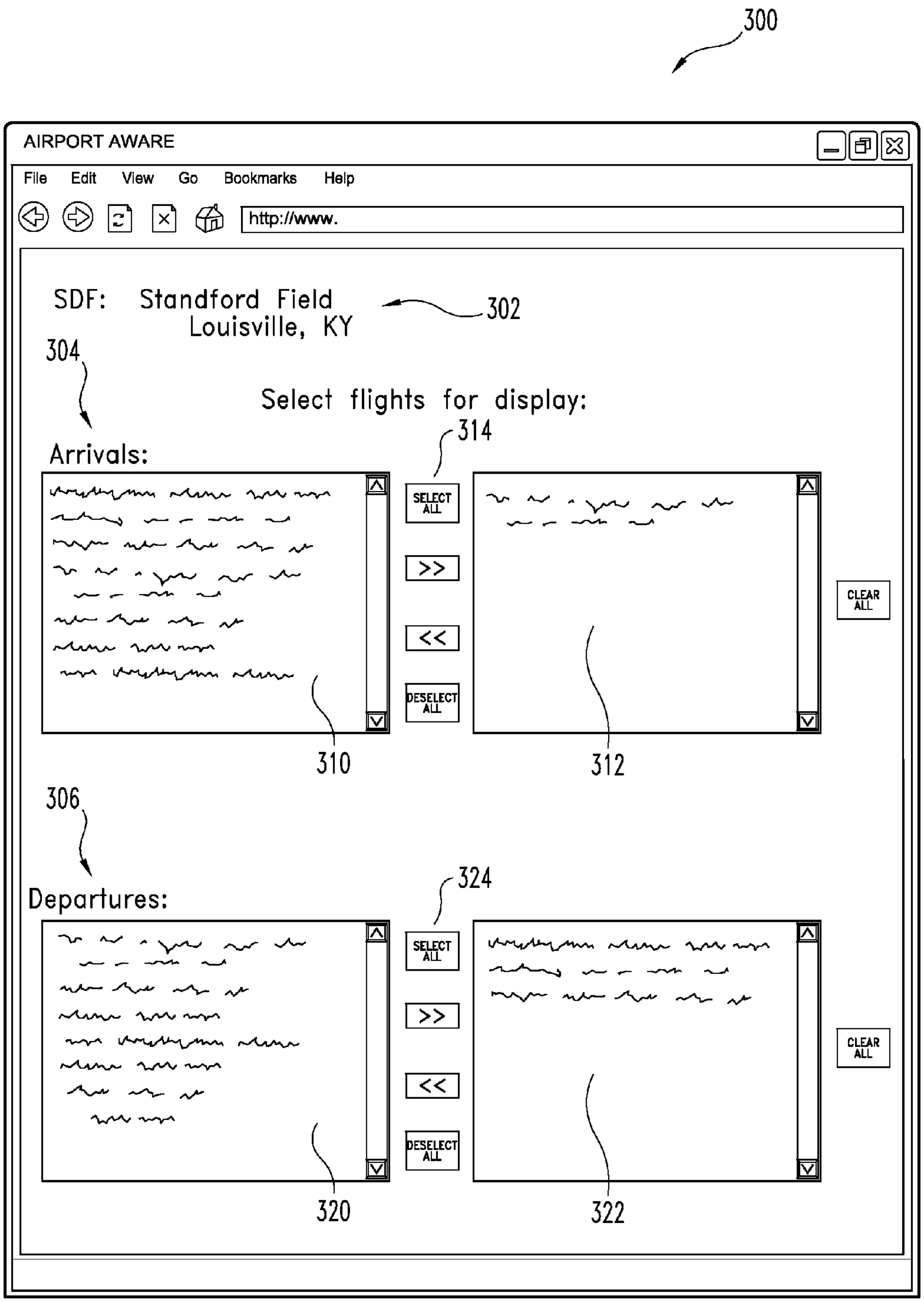
FIG. 3 is a representative web page suitable for use in selecting flights for inclusion in a display in one form of the present invention, such as shown in FIG. 1.

Turning to FIG. 3, a representative web page suitable for use in selecting flights for inclusion in a display in one form of the present invention is shown. Web page 300 is served by Web Server 11 to client computer 31 in the illustrative embodiment. Web page 300 includes an information section 302, an arrival section 304, and a departure section 306. Information section 302 includes information identifying the airport and location associated with the user. Arrival section 304 contains a listing of all flights arriving at the identified airport 310 and a listing of the currently selected flights 312. Preferably, the listing is filtered to include only non-regularly scheduled commercial and non-cargo fights. Using the user interface buttons 314, the user may easily select flights from listing 310 for inclusion in selected listing 312, deselect flight from listing 312, or clear listing 314 completed. Additionally, in other forms, the user may select flights by dragging and dropping a listing from listing 312 to selected listing 314. Similarly, the user may utilize buttons 324 to select departing flight from departure listing 320 into selected listing 322.

In a further form, the user may simply transmit a flight identifier, such as a flight or tail number to service 10 in order to select flights for inclusion. Additionally, a user may create a listing of loyal customers, identified by tail number, who frequently utilize the FBO's services. In the event service 10 identifies a flight having a tail number entered in this loyal customer list, the flight may be automatically selected for inclusion. Conversely, tail number of cargo flights or other aircraft that frequent the airport but do not use the FBO can be automatically excluded. In a still further form, the selection of flights may be automated by incorporation of client computer 31 or Web Server 11 with a scheduling system or other record keeping means of the FBO. It shall also be appreciated that various arrangements of web page 300 in addition to additional forms of selecting flights may be utilized without departing from the spirit of the present invention.

Returning to FIG. 2, once the user has selected flights, the user proceeds to enter flight specific information for one or more of the selected flights (stage 210). In the illustrative embodiment, the user may enter messages, upload images/videos, or select other content which may be selectively displayed depending upon the status of the associated flight. In the illustrative embodiment, the content is provided for viewing by the arriving/departing passengers, but in an alternate form, the content may be suitable for the staff/workers of the FBO. For example, monitor 32 may display the time left until arrival of a flight and a checklist of the tasks left to be completed in order to prepare for arrival.

Figure 4:
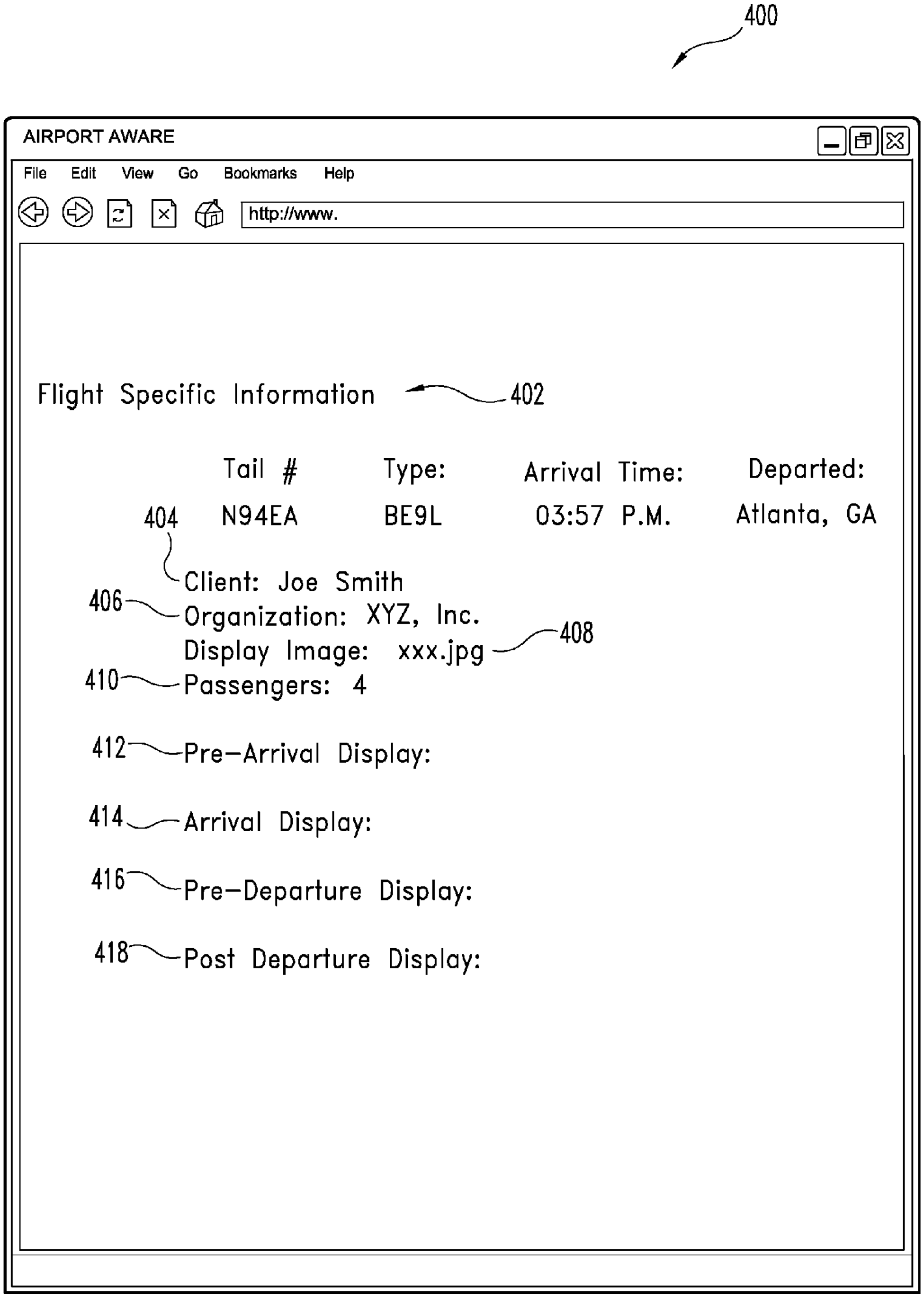
FIG. 4 is representative web page suitable entering flight specific information for a selected flight in one form of the present invention, such as shown in FIG. 1.

FIG. 4 illustrates a representative web page suitable entering flight specific information for a selected flight in one form of the present invention is shown. Web page 400 includes flight information 402 associated with the selected flight, such as flight number, tail number, aircraft type, arrival/departure time, and origin/destination. Web page 400 allows the user to input flight specific information such as the name of the client 404, the name of the entity or corporation associated with the client, 406, an image/video associated with the client or organization 408, and the number of passengers aboard 410. Web page 400 also allows the user to input a series of messages, such as pre-arrival message 412, arrival message 414, pre-departure message 416, and post-departure message 418. In this form, depending upon the nature of the flight, the user may enter information to be displayed based upon the status of the flight. For example, arrival message 414 may contain a message such as "Welcome Mr. Jones and guests, your limousine is waiting" or "Greetings XYZ, Inc.—Lunch will be served shortly." Additionally, web page 300 may also enable to user to select options such as the color coding of flights, the number of flights to display, and/or the background or layout of the display to name just a few representative examples.

Returning to FIG. 2, once the user has completed the selection of flights and their associated information, the user proceeds to configure and customize the display for presentation on the monitor (stage 212).

Once the screen layout of the display is set by the user, the system transfers the content required for the customized display (stage 214). In the illustrative embodiment, a screen layout is a combination of one or more display segments which can be combined. Display segments may be flight listings, images, videos, web pages, tickers, and other visual data utilized in a screen layout for display on monitor 32 and stored by service 10. The content, which is included within display segments, may be streamed to the client computer 31, along with flight status information, for incorporation into a signal suitable for transmission to and display upon monitor 32. Additionally, large content, such as video, may be downloaded from service 10 and stored upon client computer 31 or an attached data storage device, for subsequent use. In the preferred form, high definition content, such as news updates, advertisements, and aviation related information is provided in this form. In an alternate form, content may be provided on CD, DVD, or other digital storage medium for use by client computer 31 within display segments.

Figure 5A:
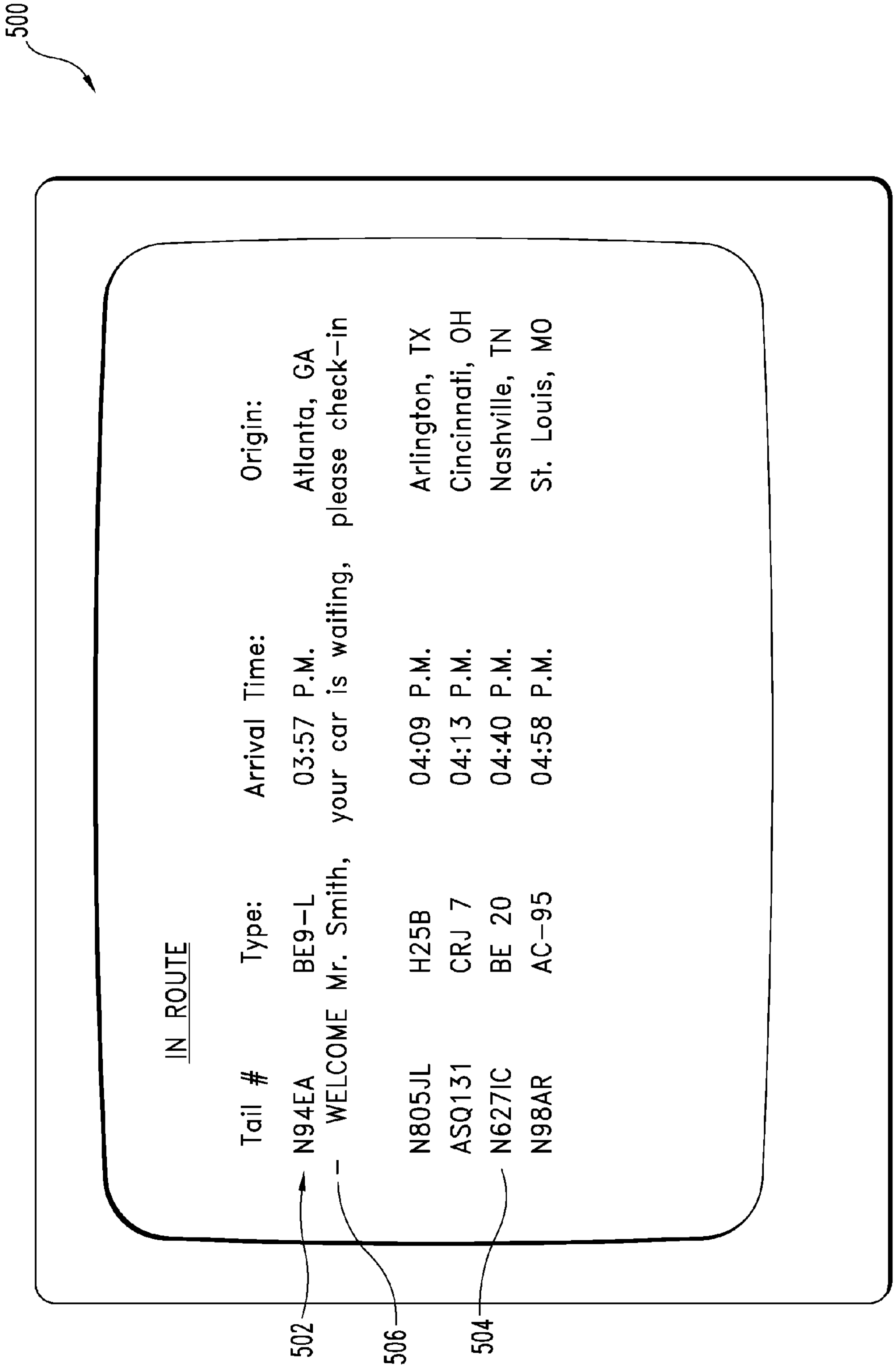
FIG. 5*a* is an illustrative screen segment containing scheduled flight arrival information, suitable for use with the invention shown in FIG. 1.
Figure 5B:
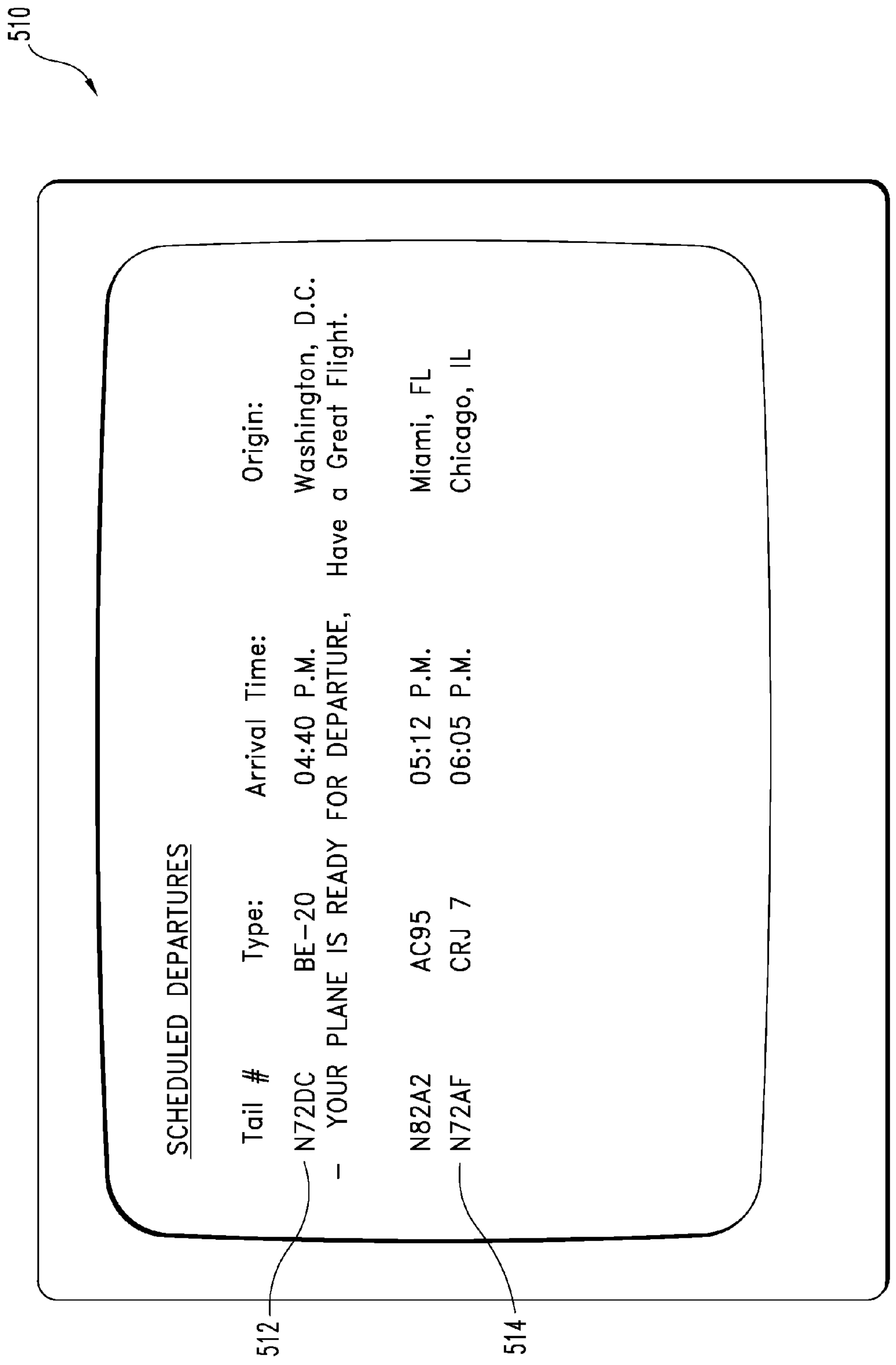
FIG. 5*b* is an illustrative screen segment containing scheduled flight departure information, suitable for use with the invention shown in FIG. 1.

Turning to FIGS. 5*a*-5*d*, several illustrative screen segments are illustrated. FIG. 5*a* depicts screen segment 500, which includes arriving flight information 502. Flight arrival information 502 includes flight listings, such as listing 504, sorted by descending time of arrival and may include recently arrived flights. Listing 504 preferably includes associated flight #, aircraft type, estimated arrival time, and origin. In a further form, personalized message 506 may be displayed near the associated listing. Similarly, FIG. 5*b* depicts screen segment 510, which includes departing flight information 512. Flight departing information 512 includes flight listings, such as listing 514, sorted by descending time of departure and may include recently departed flights. Listing 514 preferably includes associated flight #, aircraft type, scheduled departure time, and destination.

Figure 5C:
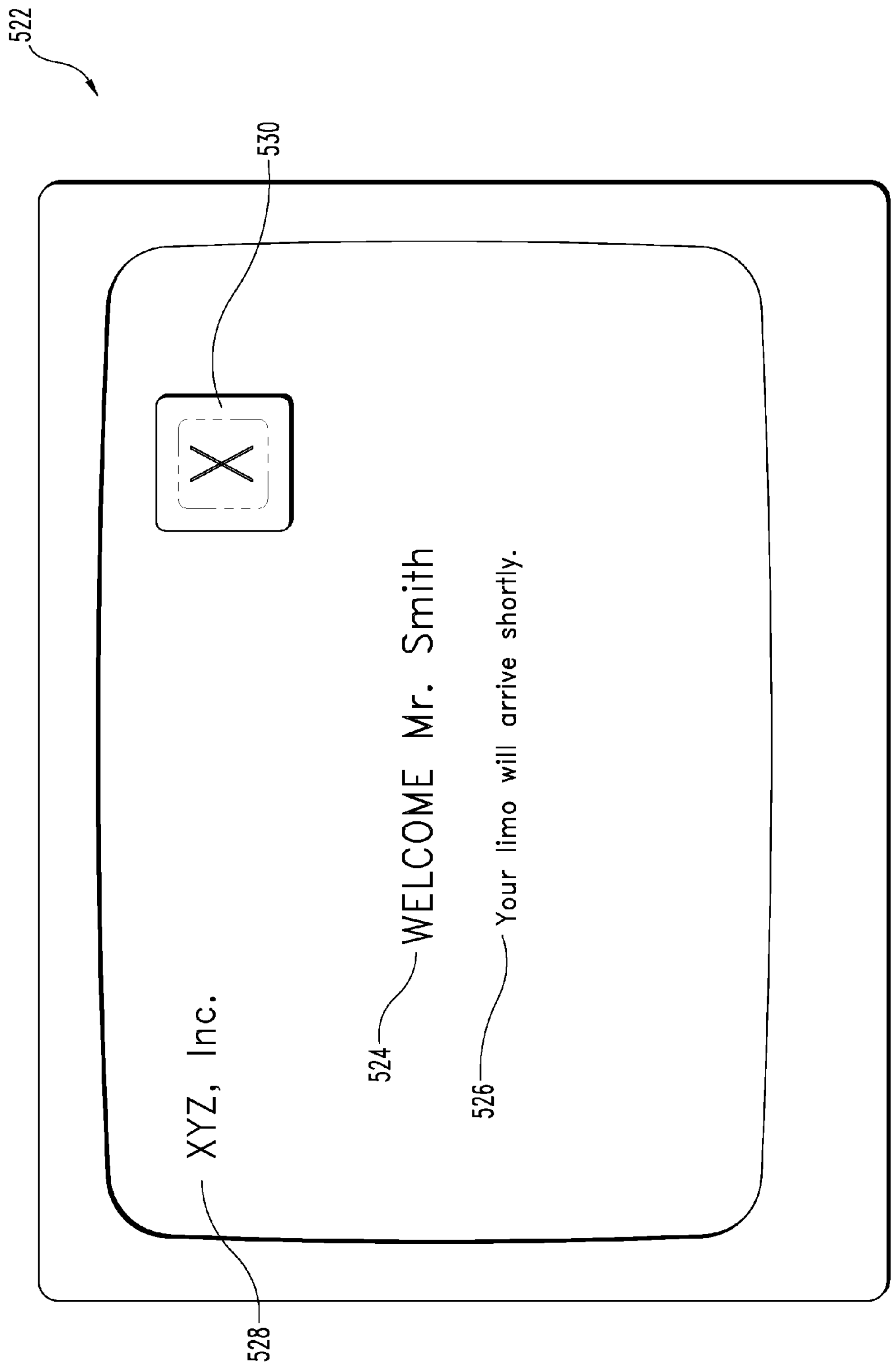
FIG. 5*c* is an illustrative screen segment containing a personalized message, suitable for use with the invention shown in FIG. 1.
Figure 5D:
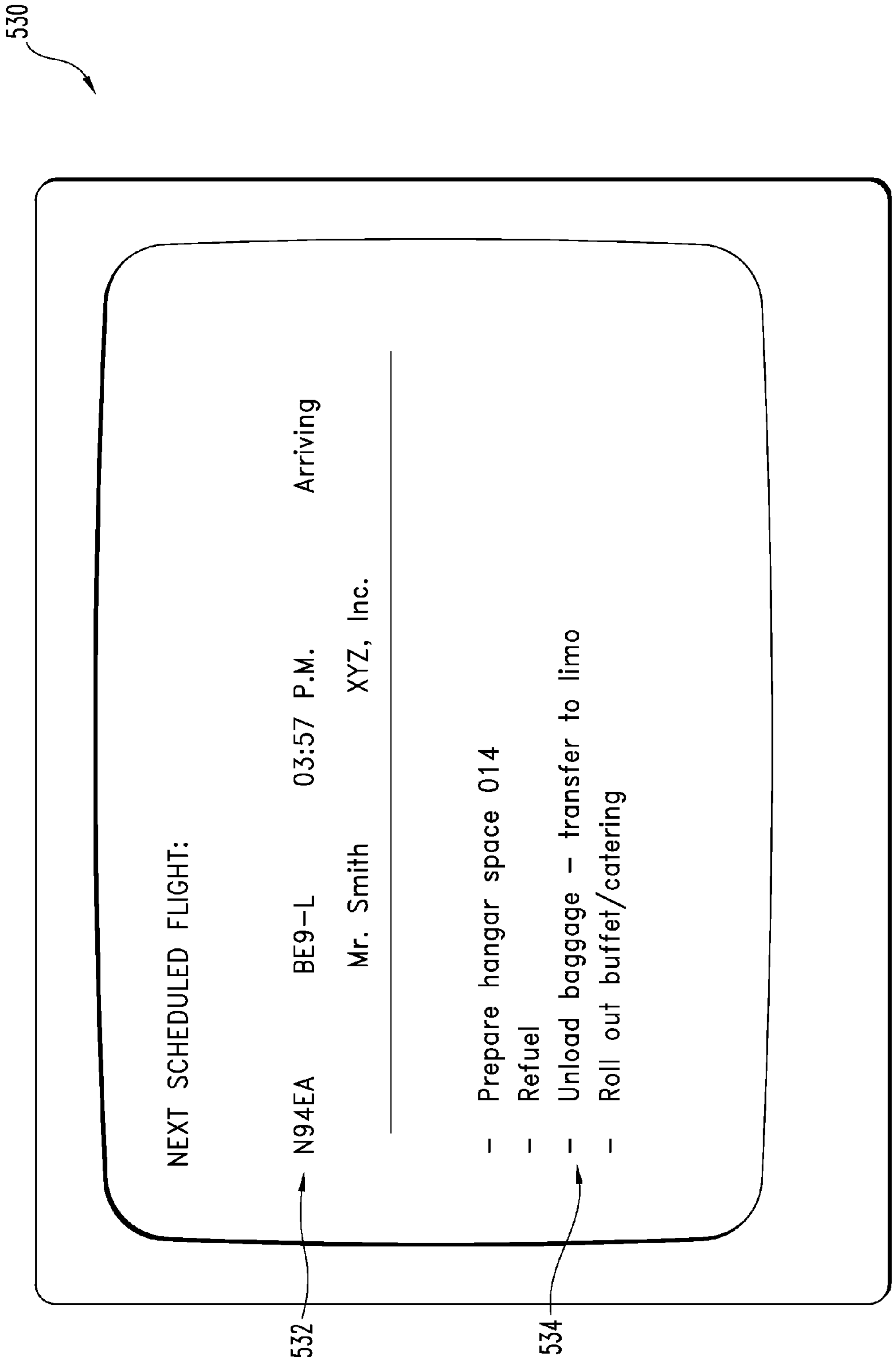
FIG. 5*d* is an illustrative screen segment containing scheduled flight service status and preparation information, suitable for use with the invention shown in FIG. 1.

FIG. 5*c* illustrates a representative client information screen segment 522. In the illustrative embodiment, screen segment 522 may be displayed for a short time after the arrival of a scheduled flight, thereby presenting customized information to the client. Screen segment 522 may include a personalized message 524, a status update 526, a client association 528, and a client image 530. For example, in the event of a corporate executive and guest, the personalize message 524 may be a welcome message welcoming the group, status message 526 may update the passengers of their next activity, whether it be lunch, dinner, or the arrival of a limousine for transportation. Additionally, the display may be tailored to the corporation with whom the executive works by displaying the corporate name, such as client association 528, and the corporate logo, client image 530.

Additionally, in an alternate form, screen segment 530 may be displayed with a listing of the next scheduled flight 532 included along with a listing of the requirements for successfully servicing that flight 534. Segment 530 may be displayed on monitor 32 when no guests are present in the FBO or on a second monitor, not shown, in the service area viewable only by the employees responsible for completing the listed tasks.

Figure 6:
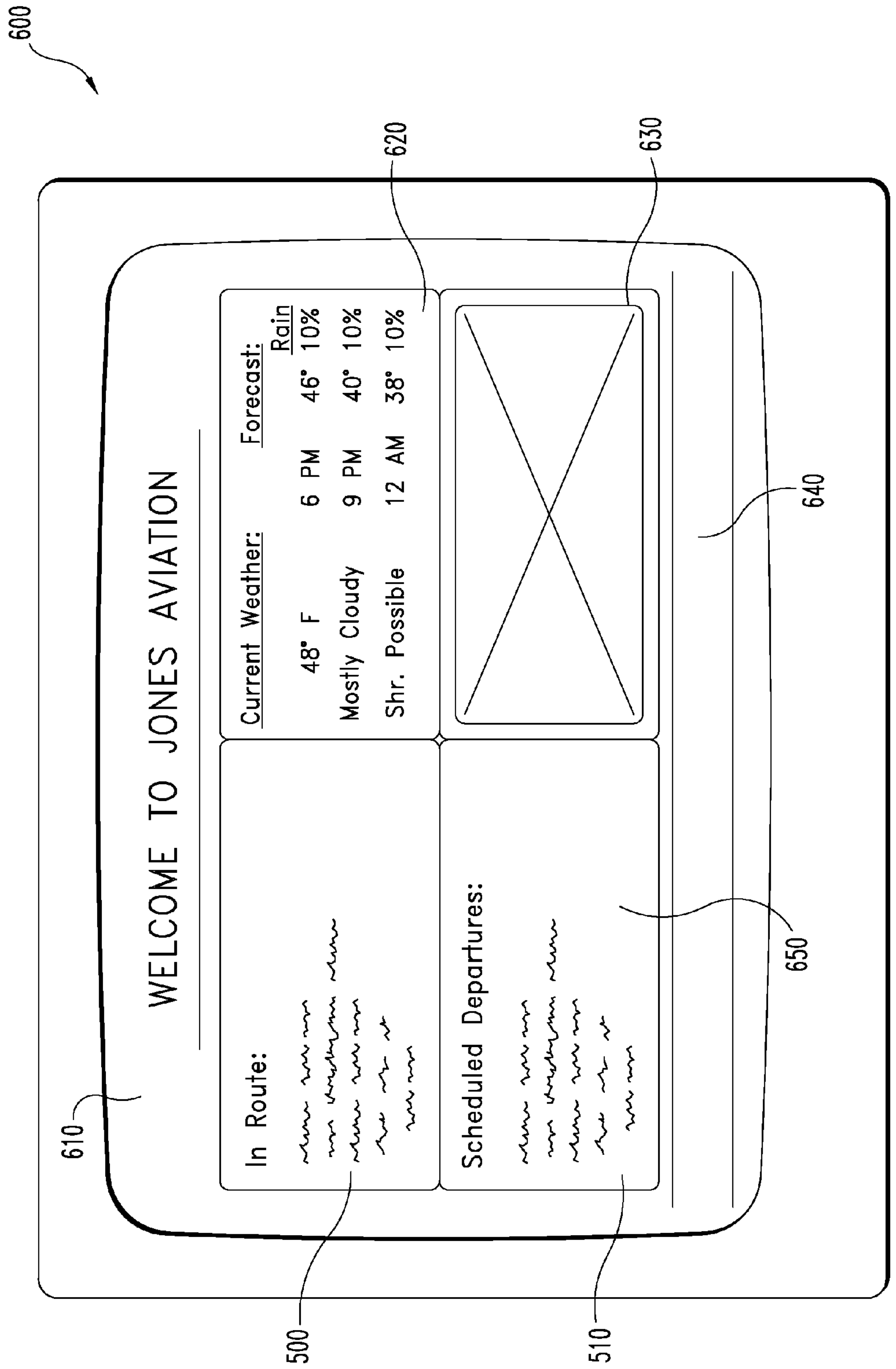
FIG. 6 is an illustrative layout containing several screen segment portions, suitable for display on a monitor of FIG. 1 in one aspect of the present invention.

FIG. 6 illustrates a representative screen layout made up of several screen segments suitable for display on monitor 32. Screen layout 600 includes screen segments 500, 510, 610, 620, 630 and 640. Additionally, screen layout 600 may include a background 650 upon which each screen segment may be overlaid. Screen segment 500 and 510, as illustrated in FIGS. 5*a*-5*b*, include flight arrival and departure information respectively which is periodically updated based upon information received from service 10. Screen segment 610 is a header segment which indicates the name of the FBO or other desired information. Screen segments 620 and 630 may be selected from a variety of different screen segments, such as weather, news, text, video, or other available content. As illustrated, screen segment 620 includes weather information for the associated airport. Screen segment 630 includes video content, such as aviation related video or a map of the local airspace showing flights in the area. In a further form, weather content may be for the destination airport in the event of an upcoming scheduled departure. Finally, segment 640 may include scrolling information such as stock ticker, news wire, or other information. Preferably, the screen layouts also include the current time and airport name, such as in segment 610 or 640. Additionally, the screen may include segments of any shape or size designated by the user. In a further form, templates are provided by service 10 for completion by the user and subsequent display.

In one form, a single screen layout is utilized and displayed, but in the preferred embodiment, numerous screen layouts are displayed sequentially for various times based upon flight information, with the display of targeted screen layouts based upon a variety of criteria, such as the status of a selected flight. For example, in one form, a set of three screen layouts may be sequentially displayed, the first displaying arrivals, the second departures, and the third displaying weather and news content. In a preferred form, a layout may be presented in response to an indication, derived from the substantially real time flight data, that a flight will be arriving soon. Such indication may be determined by a ARTCC boundary crossing, indicating that the flight has entered controlled airspace, an estimated time of arrival, a distance to the destination airport, or an air speed or altitude below a predetermined threshold. In the event that no flights are scheduled for service in the near future, the duration of the news and weather screen layout may be increased. In the event of a recent arrival, a personalized screen layout or series of layout may be displayed, as set by the user.

Returning to FIG. 2, once the user has customized the display for presentation on the monitor, the monitor displays the selected screen layout(s) (stage 216). The content of the screen segments is periodically updated by client computer 31 when information is received by service 10, such as the change in a flight status criteria. In a further form, content from other sources may be included within a screen segment, such as a weather forecast, sports scores, or a skyline camera shot. The process ends at end point 218.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A method of displaying customized flight information comprising:

connecting to a server maintaining near real-time flight tracking data over a digital communication network from a client computer;

transmitting a request to said server for flight tracking data associated with an airport;

creating a targeted message for a first flight selected from a plurality of flights included in said flight tracking data, in which said message contains personalized information beyond flight characteristics;

generating a first display segment comprising at least said targeted message for the first flight; and displaying said first display segment along with the plurality of flights on a monitor in response to a criteria that is based upon a near real-time arrival characteristic of said first flight using data from said server.

2. The method of claim 1, wherein said server receives data from the FAA Aircraft Situation Display to Industry service.

3. The method of claim 1, wherein said criteria is selected from the group consisting of an ARTCC boundary crossing, an estimated arrival time calculated using the FAA Aircraft Situation Display to Industry service, an air speed or altitude below a predetermined threshold, and a distance from said airport.

4. The method of claim 1, wherein said first flight is not a regularly-scheduled commercial flight.

5. The method of claim 1, wherein said first display segment includes the name of an entity associated with said first flight.

6. The method of claim 5, wherein said entity is a passenger of said first flight.

7. The method of claim 5, wherein said entity is a business organization.

8. The method of claim 3, further comprising the step of:

generating a second display segment based on a portion of the flight tracking data associated with said first flight; and displaying said second display segment on said monitor.

9. The method of claim 8, wherein said first display segment is displayed simultaneously with said second display segment on said monitor.

10. The method of claim 8, wherein said second display segment includes an advertisement.

11. The method of claim 10, wherein said advertisement is targeted to said first flight based upon said portion of the flight tracking data associated with said first flight.

12. The method of claim 8, wherein at least said first display and said second display segment are displayed individually in sequence on said monitor.

13. The method of claim 9, wherein at least said first display segment and said second display segment are combined to form a first layout, and said first layout is displayed on said monitor.

14. The method of claim 13, wherein said first layout includes at least 3 display segments.

15. The method of claim 14, wherein said first layout includes at least 5 display segments.

16. The method of claim 13, wherein said first layout is created using a template provided by said server.

17. The method of claim 1, wherein said first display segment is displayed over a static background on said monitor.

18. The method of claim 17, wherein said background is downloaded from said server.

19. A method of displaying customized flight information using a computer system comprising a client computer connected to a monitor, said method comprising the steps of:

connecting to a server maintaining near real-time flight tracking information over a digital communication network;

receiving a first listing of flights associated with an airport from said server;

selecting a plural subset of flights from said listing using said client computer;

generating a first display segment containing personalized information for a first flight in said subset of flights;

receiving flight tracking data associated with said first flight; and displaying said first display segment along with the plural subset of flights on said monitor.

20. The method of claim 19, wherein said first display segment also includes the status of an aircraft associated with said first flight.

21. The method of claim 19, wherein said personalized information includes the name of an entity associated with said first flight.

22. The method of claim 21, wherein said entity is a passenger.

23. The method of claim 21, wherein said entity is a business organization.

24. The method of claim 19, wherein said first flight departs from said airport and said first display segment includes status information specific to the destination of said first flight.

25. The method of claim 24, wherein said status information is weather information.

26. The method of claim 24, wherein said status information is airport delay information.

27. The method of claim 26, wherein said flight delay information is calculated using said near real-time flight tracking information.

28. The method of claim 19, wherein said server receives data from the FAA Aircraft Situation Display to Industry service.

29. The method of claim 19, wherein said selecting includes the entry of a set of flight identification numbers.

30. The method of claim 29, wherein said flight identification numbers are tail numbers.

31. The method of claim 19, wherein said subset of flights includes only flights having a pre-established relationship with said location.

32. The method of claim 31, wherein said location is a fixed based operator.

33. The method of claim 19, wherein said first display segment is combined with a distinct second display segment to create a first layout, and said layout is displayed on said monitor.

34. The method of claim 19, wherein said digital communication network comprises the Internet.

35. The method of claim 19, wherein said subset of flights is substantially free of regularly scheduled commercial passenger or cargo flights.

* * * * *